United States Patent [19]

Ettel et al.

[11] 4,006,216

[45] Feb. 1, 1977

[54] PREPARATION OF NICKEL BLACK

[75] Inventors: Victor Alexander Ettel, Mississauga; Marcel Alin Mosoiu, Toronto, both of Canada

[73] Assignee: The International Nickel Company, Inc., New York, N.Y.

[22] Filed: Jan. 26, 1976

[21] Appl. No.: 652,513

[30] Foreign Application Priority Data

July 28, 1975 Canada ............................... 232312

[52] U.S. Cl. .............................. 423/592; 423/140
[51] Int. Cl.[2] ....................................... C01G 53/04
[58] Field of Search .................. 423/592, 138, 140

[56] References Cited

UNITED STATES PATENTS

| 2,602,070 | 7/1972 | Kirkpatrick | 423/592 |
| 3,347,706 | 10/1967 | Krivanek et al. | 423/592 |
| 3,436,267 | 4/1969 | Faber | 423/592 |
| 3,869,257 | 3/1975 | Beutner et al. | 423/592 |

FOREIGN PATENTS OR APPLICATIONS 935,650  10/1973  Canada ............................. 423/592

*Primary Examiner*—Herbert T. Carter
*Attorney, Agent, or Firm*—Lewis Messulam; Ewan C. MacQueen

[57] ABSTRACT

Nickel black is prepared by treating a nickeliferous solution with base to precipitate nickel as a basic nickelous precipitate and oxidizing the precipitated nickel with the aid of a mixture containing oxygen and a reducing agent.

6 Claims, No Drawings

PREPARATION OF NICKEL BLACK

The present invention relates to the production of nickelic hydroxide.

Nickelic hydroxide is the high valency hydroxide of nickel and is commonly referred to as nickel black in view of its appearance. A major commercial application of nickel black stems from its ability to oxidize cobaltous ions in solution to their cobaltic state. Thus, use has been made of nickel black to treat nickel-containing solutions to remove cobalt from them prior to their further processing, e.g., by electrowinning, to recover pure nickel.

The oxidation of nickel to its trivalent state cannot be carried out by direct treatment of a solution with oxygen along even when elevated temperatures and pressures are resorted to. One method which has been used for preparing nickel black relies on sodium hypochlorite as the oxidizing agent. In an alternative approach nickelous ions are oxidized electrolytically to produce the nickel black. Because of the cost of reagents as well as the electrical power involved, neither of the above-mentioned processes has satisfied the need for an inexpensive method or preparing nickel black.

A more recent proposal for the preparation of nickel black is described in the supplementary disclosure of Canadian Pat. No. 935,650, in which a nickel solution is treated with air and sulfur dioxide to bring about precipitation of the nickelic hydroxide. The process in question entails adjusting the pH of the nickel solution to be treated to a value high enough for nickelic ions to be precipitated but not high enough to precipitate nickelous ions. In this way the presence of nickelous hydroxide during, or at the end of, the process is avoided. This process is however slow and inefficient and as a result a large amount of sulfur dioxide has to be added over a long period of time, only a small portion of the sulfur dioxide added being used for the desired oxidation of the nickel.

It is therefore an object of the present invention to provide an improved efficient process for preparing nickel black with the aid of inexpensive reagents.

According to the invention nickelic hydroxide is produced by treating a nickeliferous solution with a base to precipitate nickel as a basic nickelous precipitate and introducing into the resulting nickeliferous slurry a mixture containing oxygen and a reducing agent selected from the group consisting of sulfur dioxide and metal sulfites and bisulfites, the oxygen content of the mixture being in excess of the stoichiometric amount needed to oxidize the reducing agent present therein, and the reducing agent being introduced into the slurry at a rate which does not substantially exceed the rate of consumption thereof.

It is an important feature of the process of the invention, and one which leads to the efficiency of the process, that the divalent nickel to be oxidized is in the form of a nickelous precipitate rather than in solution. The pH needed to ensure that the material treated is a nickelous slurry rather than a solution depends to some extent on the temperature of the reaction as well as the exact composition of the electrolyte, but in general a pH of at least 8.0 will ensure the presence of the slurry. While there is no fixed upper limit on the pH to which the solution can be raised, it is unnecessary and wasteful of reagents to operate at a pH higher than about 8.5. In general the nickel percipitate will comprise essentially nickelous hydroxide, but may contain varying amounts of basic nickel sulfate.

For the purpose of adjusting the pH of the solution, use can be made of any base such as sodium hydroxide or potassium hydroxide which brings about the precipitation of nickelous hydroxide. Ammonia cannot be used for this purpose in view of the fact that it prevents precipitation of the nickel by forming water-soluble ammine complexes therewith. Calcium hydroxide is suitable for use in adjusting the pH of the nickeliferous solution and can be added to the solution either in solid form or as an aqueous slurry.

When the oxidation is performed by bubbling sulfur dioxide through the nickel (II) hydroxide slurry, the pH of the slurry tends to drop. Accordingly in order to avoid dissolution of the nickel (II) hydroxide to form nickel sulfate, it will generally be necessary to add a stoichiometric amount of a base with the sulfur dioxide, unless sufficient excess of base was initially present in the nickel (II) hydroxide slurry. For optimum efficiency, it has been found preferable to monitor the pH of the slurry and to maintain it substantially constant, by suitable addition of base, at the desired value or within the desired range, e.g., 8.0–8.5.

Because of the presence in general of nickelous hydroxide precipitate at the start of the oxidation process, unless complete oxidation is achieved, the final slurry obtained will comprise a mixture of nickelous and nickelic hydroxides. While virtually complete oxidation can be achieved by the process of the invention, in practice this is usually unnecessary. Thus where the nickel black is required for use as a means precipitating impurities such as cobalt from a nickel electrolyte, the presence of some nickelous hydroxide mixed therewith is not detrimental, and may actually be beneficial in helping to raise the pH of the nickel electrolyte to the point at which cobalt is precipitated.

The process of the invention can be carried out at room temperature, but preferably the nickeliferous slurry to be oxidized is heated to a temperature of between about 40° and 60° C and maintained at such a temperature during the oxidation process. The oxygen required for the process may be introduced into the slurry in pure form, or as air. While the reducing agent used in the process can be sulfur dioxide or any metal sulfite or bisulfite, a preferred reducing agent to be used is freshly prepared calcium sulfite. The latter can be prepared inexpensively, immediately before its proposed use, by bubbling sulfur dioxide through a calcium hydroxide or calcium carbonate slurry. In practice calcium sulfite may be readily available as the by-product of processes for scrubbing sulfur dioxide from process tail gases. Apart from its cheapness and ready availability, calcium sulfite is preferred in that it has been found to be particularly effective for use as the reducing agent in the process of the invention.

When calcium sulfite has been used for the oxidation of the nickel (II) hydroxide, the resulting solids consist of an intimate mixture of nickelic hydroxide, nickelous hydroxide and gypsum. The presence of gypsum therein does not detract from the utility of the solids for cobalt precipitation. Thus when a cobalt-containing solution is treated with such a mixture, in a single-stage or in a multi-stage countercurrent operation, a gypsum-containing cobaltic precipitate is obtained which has better filterability than a gypsum-free cobaltic precipitate. To produce a pure cobalt product, the cobaltic precipitate is redissolved, the gypsum is then conveniently separated from the solution and the latter is treated to re-precipitate the cobalt.

The invention will now be specifically described with reference to examples.

EXAMPLE 1

A liter of nickel sulfate solution, containing 35 g/l of nickel, was treated with 50 g of calcium hydroxide to give a nickelous hydroxide suspension having a pH of 8. Two liters of a 1.2 molar calcium hydroxide slurry were treated with sulfur dioxide gas, at a rate of 2.7 g/min until the pH of the slurry had dropped to 5. An almost quantitative yield of calcium sulfite was obtained in this way, and the pH of the resulting sulfite slurry was raised to 11.5 by addition of a few drops of sodium hydroxide.

The nickel hydroxide suspension was aerated by passing about 8–10 l/min of air through gas spargers while stirring the suspension at 1000 rpm. The freshly prepared calcium sulfite slurry was introduced at the rate of 130 ml/h. into the aerated suspension which was initially at room temperature. In the course of the oxidation process the temperature was observed to rise slowly (from 21 to 33° C in about 4 hours). The pH of the suspension fell from 8 to slightly below 7.5 in the first hour and thereafter more slowly, reaching 7.1 after about four hours.

By analyzing the suspension iodometrically to determine the concentration of nickelic ions at various stages of the process, it was found that after 1 hour, 12–13% of the nickel in the suspension had been oxidized to the nickelic state, while after 4 hours about 50% of the total nickel present was in the trivalent state.

The efficiency of the process can be judged by evaluating the number of moles of reducing agent (i.e. sulfur dioxide or metal sulfite) used per mole of nickelic hydroxide obtained. In the present Example it was found that the molar ratio: sulfur dioxide used/resulting nickelic hydroxide was about 2:1.

almost instantaneously to 8.7 from 4.3. Further treatment for two hours with the sodium sulfite solution, with the pH maintained within the range 9.8–10.7 by appropriate addition of the sodium hydroxide solution, resulted in a final slurry of nickelous and nickelic hydroxides wherein 24% of the nickel was in the trivalent state.

An evaluation of the efficiency of utilization of the sodium sulfite showed that 5 moles of the reducing agent had been added for each mole of trivalent nickel in the final slurry. This utilization is poorer than that obtained when calcium sulfite was used as the reducing agent.

EXAMPLE 3

A solution of nickel sulfate containing 10 g/l of nickel was treated at 30° C with sodium hydroxide to raise the pH to 8.3. A first sample of the resulting suspension was then aerated and treated for one hour with freshly prepared calcium sulfite in the manner described in Example 1 except that the pH was maintained constant by addition of sodium hydroxide as required. A second sample of the nickelous hydroxide suspension was oxidized using pure sulfur dioxide instead of calcium sulfite as the reducing agent, the sulfur dioxide being bubbled together with the air into the stirred suspension.

A series of comparative tests were carried out in identical manner to those described above except that the pH of the nickel solution was adjusted at the start of the tests to 6.6 or 7.0 and maintained at the level in question during the test. These tests were therefore not in accordance with the process of the present invention in that the nickel was not precipitated as nickelous hydroxide prior to the treatment with the mixture of air and sulfur dioxide or air and calcium sulfite.

The results obtained in the tests in accordance with the invention (Tests 1 and 2) as well as the Comparative Tests (Tests A, B and C) are shown in Table 1 below.

TABLE 1

| Test No. | pH of solution or suspension | Reducing Agent used | Amount of Reducing Agent Added (Moles/Mole of total Ni Present) | % of Total Nickel Oxidized to $Ni^{3+}$ |
|---|---|---|---|---|
| 1 | 8.3 | Ca SO$_3$ | 0.79 | 36.7 |
| 2 | 8.3 | SO$_2$ | 0.79 | 3.2 |
| A | 6.6 | Ca SO$_3$ | 0.79 | 0 |
| B | 6.6 | SO$_2$ | 0.72 | 0 |
| C | 7.0 | SO$_2$ | 1.05 | 1.05 |

EXAMPLE 2

Using a nickel sulfate solution and a caustic soda solution, 800 mls of an approximately 0.2 molar nickelous hydroxide slurry of pH 7.5 were prepared.

The slurry was treated with air and a solution of sodium sulfite and sodium carbonate for 1 hour at the end of which time the pH had dropped to 7.2 which was not high enough to ensure precipitation of all the nickelous ions. It was found that oxidation of the nickelous ions had virtually ceased after the first 30 minutes with 4.3% of the nickel initially present having been oxidized to its trivalent state.

At this stage, i.e. after 1 hour of oxidation, a sodium hydroxide solution was introduced to raise the pH of the slurry to 9.8 thus ensuring precipitation of all nickelous ions present. As a result the percentage of nickel present in the trivalent state was found to increase The above results demonstrate the superior efficiency of the process of the invention as compared with the prior advocated practice of treating clear nickel solutions rather than nickelous hydroxide suspensions.

EXAMPLE 4

A nickelous hydroxide suspension was prepared by neutralizing a nickel sulfate solution, containing 13.5 g/l of nickel, with lime to a pH of 8.25. The suspension was then treated with air and a freshly prepared calcium sulfite slurry of 0.94 molar concentration.

The pH was maintained constant at 8.0 by small additions of a 40 g/l lime slurry. Four tests (3–6) were carried out in which the temperature of the nickeliferous slurry was maintained at 25°, 35°, 45° and 55° C respectively. In all cases air was sparged in at the rate of 12 l/min through 850 mls of the nickelous hydroxide slurry, while the calcium sulfite slurry was introduced at the rate of 80 ml/hour. The results obtained, which are shown in Table 2 below, show that the rate of oxidation, particularly initially, is improved by raising the temperature within the range examined. The improved efficiency is evidenced by the ratio of reducing agent used to the nickelic hydroxide produced. The tests at 45° and 55° C gave better efficiency and did not exhibit the high initial sulfur dioxide requirement which was exhibited in the lower temperature tests.

TABLE 2

| Test No. | Temperature °C | Duration of Reaction (mins) | % of Total Nickel Oxidized to $Ni^{3+}$ | Reducing Agent used $\left(\dfrac{\text{moles Ca SO}_3}{\text{moles of Ni}^{3+}}\right)$ |
|---|---|---|---|---|
| 3 | 25° C | 30 | 7.7 | 2.32 |
|   |       | 60 | 20.2 | 1.79 |
|   |       | 120 | 50.9 | 1.54 |
| 4 | 35° | 30 | 14.8 | 1.68 |
|   |     | 60 | 26.1 | 1.33 |
|   |     | 120 | 49.8 | 1.55 |
| 5 | 45° | 30 | 14.6 | 1.04 |
|   |     | 60 | 29.7 | 1.08 |
|   |     | 120 | 57.5 | 1.19 |
| 6 | 55° | 30 | 14.8 | 1.10 |
|   |     | 60 | 31.3 | 1.10 |
|   |     | 120 | 67.5 | 1.14 |

EXAMPLE 5

To determine the effect on the process efficiency of rates of addition of the reducing agent, two further Tests (Nos. 7 and D) were carried out in identical manner to Test No. 6 described above, except for the concentration and rate of addition of the reducing agent. In the case of Test No. 7 a slower rate of addition of the reducing agent was ensured by diluting the calcium sulfite slurry in question with water to provide a 0.565 molar slurry. This diluted slurry was then introduced at the rate of 80 ml/hour into the reaction vessel. In all cases calcium sulfite addition was discontinued after two hours.

In the case of Test D, a calcium sulfite slurry of 0.935 molar concentration, was pumped into the reaction vessel at the rate of 180 ml/hour. This represented a higher rate of introduction than the rate of consumption as can be seen from the results given in Table 3 below. It should be noted that the rate of air sparging (12 l/min) was high enough to ensure that even in the case of Test D the mixture of air and reducing agent contained more oxygen than is required to oxidize the reducing agent present.

It will be seen from the above that when, contrary to the conditions of the present invention, the reducing agent is introduced at a rate higher than its rate of utilization, the result is not only a much poorer ratio of reducing agent used to nickelic hydroxide formed, but also a much lower rate of formation of the nickelic hydroxide.

EXAMPLE 6

In order to determine the effectiveness of nickel black prepared by the process of the invention as a cobalt precipitant the following test was undertaken.

A nickelous hydroxide slurry was treated with calcium sulfite and air in a similar manner to that described hereinbefore to oxidize 63.05% of the nickel present and produce a nickel black slurry containing 11.45 g/l of trivalent nickel. 78 mls of this nickel black slurry were used to treat 400 mls of a sulfate solution containing:

10.1 g/l of nickel,
1.03 g/l of cobalt, and
3. g/l of magnesium.

The sulfate solution to be treated was at 65° C and had a pH of 5.60. On adding the nickel black slurry the pH decreased slowly and the temperature increased slightly so that after 80 minutes the temperature had reached 69° C and the pH was 4.98. By filtering a small sample of the reacted mixture, the cobalt level in the filtrate was found to be 0.1 g/l.

A further 10 mls of the nickel black slurry were then added to the reaction vessel and, after a further 40 minutes, the pH was found to have reached 5.08. The resulting slurry was filtered and exhibited a good rate of filtration. The filter cake obtained was found to contain 5.29% by weight of nickel and 2.09% by weight of cobalt, while the filtrate obtained analyzed:

8.95 g/l of nickel, and
0.0123 g/l of cobalt.

While the present invention has been described with reference to specific embodiments thereof, it will be understood that various modifications may be resorted to without departing from the scope of the present invention which is defined by the appended claims.

What is claimed is:

1. A process for producing nickelic hydroxide comprising treating a nickeliferous solution with a base, which does not form a water-soluble complex with nickel, so as to raise the pH of the solution to at least about 8.0 and thereby precipitate nickel as a basic nickelous precipitate and introducing into the resulting nickeliferous slurry a mixture containing oxygen and a reducing agent selected from the group consisting of

TABLE 3

| Test No. | Reducing Agent Concentration (Molar) | Rate of Addition ml/hour | Duration of Reaction (mins) | % of Total Nickel Oxidized to $Ni^{3+}$ | Reducing Agent used $\left(\dfrac{\text{moles Ca SO}_3}{\text{moles of Ni}^{3+}}\right)$ |
|---|---|---|---|---|---|
| 6 | 0.94 | 80 | 60 | 31.3 | 1.10 |
|   |      |    | 120* | 67.5 | 1.14 |
|   |      |    | 180 | 71.4 | 1.00 |
| 7 | 0.565 | 80 | 60 | 19.9 | 1.03 |
|   |       |    | 120* | 42.5 | 1.15 |
|   |       |    | 180 | 41.8 | 1.02 |
| D | 0.935 | 180 | 60 | 0 | 0 |
|   |       |     | 120* | 10.3 | 14.9 |
|   |       |     | 180 | 20.5 | 7.49 |

*Calcium sulfite addition was discontinued at this point.

sulfur dioxide and metal sulfites and bisulfites, the oxygen content of the mixture being in excess of the stoichiometric amount needed to oxidize the reducing agent present therein, and the reducing agent being introduced into the slurry at a rate which does not substantially exceed the rate of consumption thereof.

2. A process as claimed in claim 1 wherein the mixture comprises air and calcium sulfite which has been freshly prepared by bubbling sulfur dioxide through a slurry of a calcium base selected from the group consisting of calcium hydroxide and calcium carbonate.

3. A process as claimed in claim 2 wherein the base used to treat the nickeliferous solution is calcium hydroxide.

4. A process as claimed in claim 1 wherein the pH of the nickeliferous solution is raised by means of the base to a value of 8.0 to 8.5 prior to introduction of the mixture.

5. A process as claimed in claim 4 wherein base is introduced into the nickeliferous slurry during the introduction of the mixture to maintain the pH within the range 8.0 to 8.5.

6. A process as claimed in claim 1 wherein the temperature of the nickeliferous slurry is maintained within the range of 40°–60° C during the introduction of the mixture.

* * * * *

UNITED STATES PATENT OFFICE
CERTIFICATE OF CORRECTION

PATENT NO. : 4,006,216
DATED : February 1, 1977
INVENTOR(S) : VICTOR ALEXANDER ETTEL and MARCEL ALIN MOSOIU It is certified that error appears in the above-identified patent and that said Letters Patent are hereby corrected as shown below:

Column 1, line 17, after "gen" delete "along" and insert --alone--.

Column 2, line 32, after "means" insert --of--.

Signed and Sealed this nineteenth Day of July 1977

[SEAL]

Attest:

RUTH C. MASON
*Attesting Officer*

C. MARSHALL DANN
*Commissioner of Patents and Trademarks*